(12) United States Patent
Nakamura (10) Patent No.: US 7,913,505 B2
(45) Date of Patent: Mar. 29, 2011

(54) AIR CONDITIONING DEVICE FOR WORK VEHICLE

(75) Inventor: Norimi Nakamura, Sakai (JP)

(73) Assignee: Kubota Corporation, Osaka (JP)

( * ) Notice: Subject to any disclaimer, the term of this patent is extended or adjusted under 35 U.S.C. 154(b) by 215 days.

(21) Appl. No.: 11/511,864

(22) Filed: Aug. 29, 2006

(65) Prior Publication Data

US 2007/0214818 A1 Sep. 20, 2007

(30) Foreign Application Priority Data

Mar. 16, 2006 (JP) ................. 2006-072955

(51) Int. Cl.
*B60H 1/32* (2006.01)
*F25B 27/00* (2006.01)
*B60K 11/06* (2006.01)
*B60K 11/04* (2006.01)

(52) U.S. Cl. .......... 62/239; 62/244; 62/323.1; 180/68.1; 180/68.4

(58) Field of Classification Search .............. 62/239, 62/244, 323.1
See application file for complete search history.

(56) References Cited

U.S. PATENT DOCUMENTS

| | | | | |
|---|---|---|---|---|
| 2,788,775 A | * | 4/1957 | Steiner ................ | 123/41.46 |
| 3,021,171 A | * | 2/1962 | Barenyi ................ | 296/24.33 |
| 3,449,924 A | | 6/1969 | Sudmeier | |
| 3,494,413 A | | 2/1970 | Dixon | |
| 3,628,348 A | * | 12/1971 | Dixon ................ | 62/241 |
| 3,724,232 A | | 4/1973 | Dixon et al. | |
| 3,762,758 A | * | 10/1973 | Wilkerson ............... | 296/180.2 |
| 3,817,054 A | | 6/1974 | Adams | |
| 3,918,547 A | * | 11/1975 | Kramer et al. ............ | 180/68.1 |
| 3,924,524 A | | 12/1975 | Whisler | |
| 3,983,715 A | * | 10/1976 | Hair et al. ................ | 62/243 |
| 4,672,296 A | * | 6/1987 | Griffin ................ | 322/1 |
| 4,874,036 A | * | 10/1989 | Masuda ............... | 165/42 |
| 5,358,304 A | * | 10/1994 | Kanemitsu et al. ...... | 296/193.09 |
| 5,392,936 A | * | 2/1995 | Solomon et al. .......... | 212/258 |
| 6,932,148 B1 | * | 8/2005 | Brummett et al. ......... | 165/43 |
| 7,021,074 B2 | | 4/2006 | Hara et al. | |
| 7,278,511 B1 | * | 10/2007 | Gass et al. ............ | 180/409 |
| 7,389,840 B2 | * | 6/2008 | Makuta et al. .......... | 180/65.31 |
| 7,434,611 B2 | * | 10/2008 | Wunderlich et al. ........ | 165/202 |
| 7,677,646 B2 | * | 3/2010 | Nakamura ............ | 296/190.08 |

(Continued)

FOREIGN PATENT DOCUMENTS

EP 0 678 441 A1 10/1995

(Continued)

OTHER PUBLICATIONS

Cutaway image of 2003 Porsche Boxter; copyright Porsche found at http://www.seriouswheels.com/2000-2003/2003-Porsche-Boxster-Cutaway-1280x960.htm on Jul. 28, 2009.*

(Continued)

*Primary Examiner* — Ljiljana (Lil) V Ciric
*Assistant Examiner* — Alexis K Cox
(74) *Attorney, Agent, or Firm* — The Webb Law Firm (57) ABSTRACT

A work vehicle comprises a plurality of wheels; a vehicle body supported by the plurality of wheels and having a cabin, a front half region and a rear half region; an engine located in the rear half region of the vehicle body; and an air conditioning unit located in a lower forward region of the cabin and having an evaporator and a fan.

13 Claims, 10 Drawing Sheets

U.S. PATENT DOCUMENTS

| | | | |
|---|---|---|---|
| 2001/0054657 A1* | 12/2001 | Moriya et al. | 241/101.74 |
| 2002/0108362 A1* | 8/2002 | Amaro et al. | 56/12.8 |
| 2003/0079925 A1* | 5/2003 | Shinohara et al. | 180/89.13 |
| 2003/0116313 A1* | 6/2003 | O'Donnell | 165/202 |
| 2004/0031612 A1* | 2/2004 | Lord et al. | 166/308.3 |
| 2004/0035962 A1* | 2/2004 | Moro et al. | 241/101.74 |
| 2005/0178136 A1* | 8/2005 | Hara et al. | 62/239 |
| 2005/0189100 A1* | 9/2005 | Kawahara et al. | 165/202 |
| 2005/0233857 A1* | 10/2005 | Horiuchi et al. | 477/120 |
| 2007/0257516 A1* | 11/2007 | Davis et al. | 296/190.09 |
| 2008/0264088 A1* | 10/2008 | Hirsch et al. | 62/236 |

FOREIGN PATENT DOCUMENTS

| | | |
|---|---|---|
| EP | 993 986 A2 | 4/2000 |
| GB | 923037 | 4/1963 |
| GB | 1079203 | 8/1967 |
| JP | 58190273-U A | 12/1983 |
| JP | 06068923-U A | 9/1994 |
| JP | 10086845 A | 4/1998 |
| JP | 2000144802 A | 5/2000 |
| JP | 2001334822 A | 12/2001 |
| JP | 2002096624 | 4/2002 |
| JP | 2004268799 | 9/2004 |
| JP | 2005001537 | 1/2005 |
| JP | 2006002980 A | 1/2006 |
| JP | 2006218908 A | 8/2006 |

OTHER PUBLICATIONS

Cutaway image of Volkswagen Minibus found at http://blog.onpaperwings.com/uploaded_images/cutaway59deluxe-761863.jpg on Jul. 28, 2009.* vintagebus.com PDF image with key retreived Tuesday, Oct. 20, 2009 listed as "bus body dimension sheet" and "bus body dimension sheet key" under miscellaneous technical.*

Vintagebus.com PDF image with key Retreived May 21, 2010 Miscellaneous technical documents "bus body dimension sheet" "bus body dimension sheet key".*

Oxford English Dictionary, online edition definition of vertical retreived May 21, 2010.*

Road and Track Illustrated Automotive Dictionary by John Dinkel Bentley Publishers (c) 2000 definition of "frame".*

Road and Track Illustrated Automotive Dictionary by John Dinkel Bentley Publishers (c) 2000 definition of "suspension".*

* cited by examiner

AIR CONDITIONING DEVICE FOR WORK VEHICLE

BACKGROUND OF THE INVENTION

The present invention is directed to an air conditioning device for a work vehicle having a cabin.

Examples of such air conditioning devices for work vehicles include one where an engine and an air conditioning unit are provided to the front of the vehicle body (see, for example, JP2002-96624 (paragraph numbers 0033, 0036, FIGS. 1-4, and 7) and another where the engine is provided to the front of the vehicle and the air conditioning unit located in the upper region of the cabin (see, for example, JP 2005-1537 (paragraph number 0015, FIGS. 1-3).

With the first structure, since the engine and the air conditioning unit are located in the limited area in the front of the vehicle, these components tend to overlap or be crammed makes their maintenance difficult.

With the second structure, since the air conditioning unit is located in the upper portion of the cabin, the center of gravity of the vehicle is high, reducing stability of the vehicle.

SUMMARY OF THE INVENTION

An object of the present invention is to improve serviceability to the engine and the air conditioning unit as well as stability of the vehicle.

A work vehicle in accordance with the invention comprises: a plurality of wheels; a vehicle body supported by the plurality of wheels and having a cabin, a front half region and a rear half region; an engine located in the rear half region of the vehicle body; and an air conditioning unit located in a lower forward region of the cabin and having an evaporator and a fan.

Since the engine and the air conditioning unit are distributed to the vehicle rear and lower front to the vehicle, this structure facilitates the maintenance work for these parts.

Also, by locating the air conditioning unit in the lower front of the vehicle, the center of gravity of the vehicle can be lowered as compared with the air conditioning unit provided to the upper portion of the cabin. This also allows supplying of conditioned air not only to the upper body of the operator but also to lower body without the necessity to extend the air conditioning duct from the upper portion to the lower portion of the cabin.

DETAILED DESCRIPTION OF PREFERRED EMBODIMENTS

Figure 1:
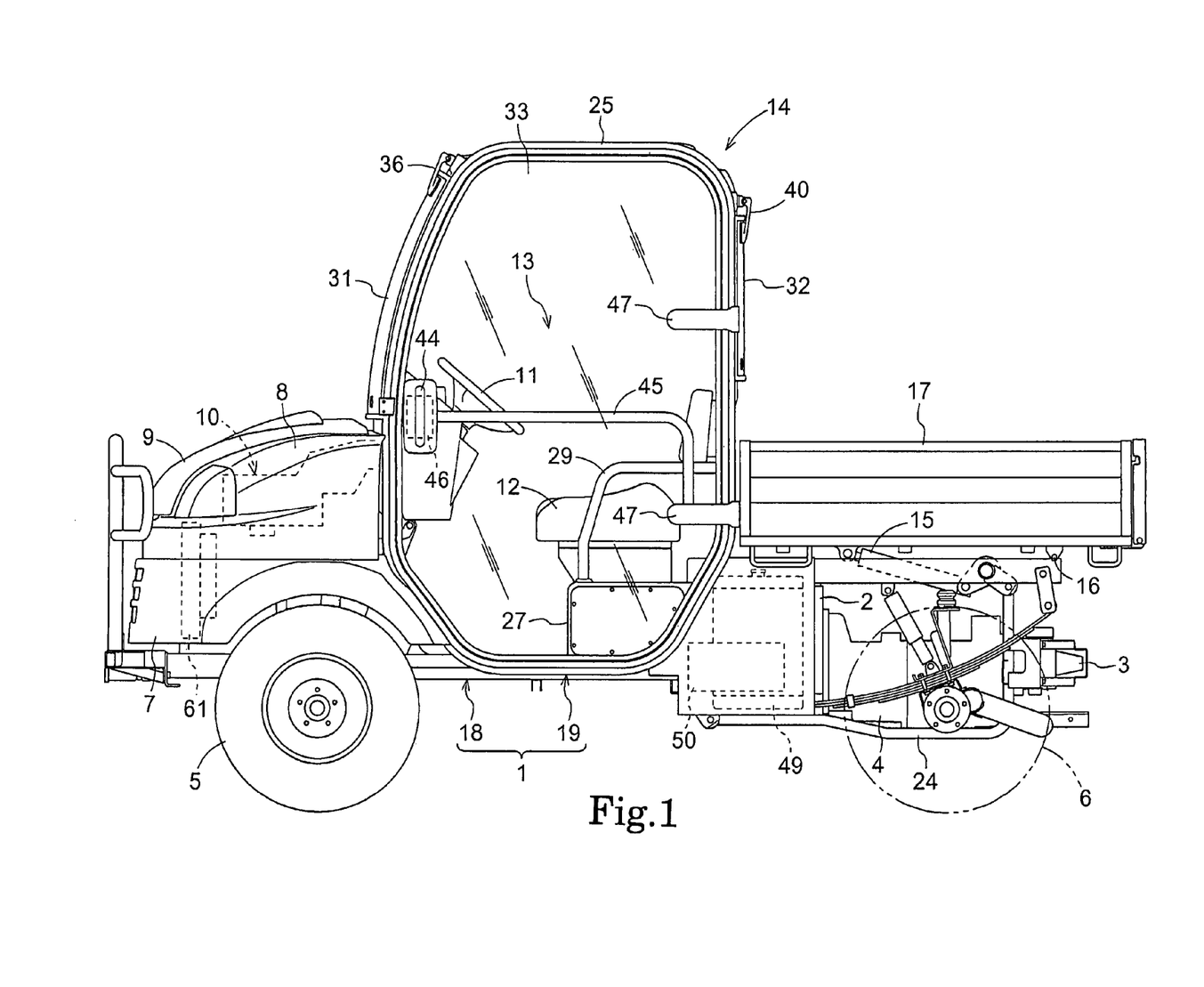
FIG. 1 is a side view of the work vehicle.
Figure 2:
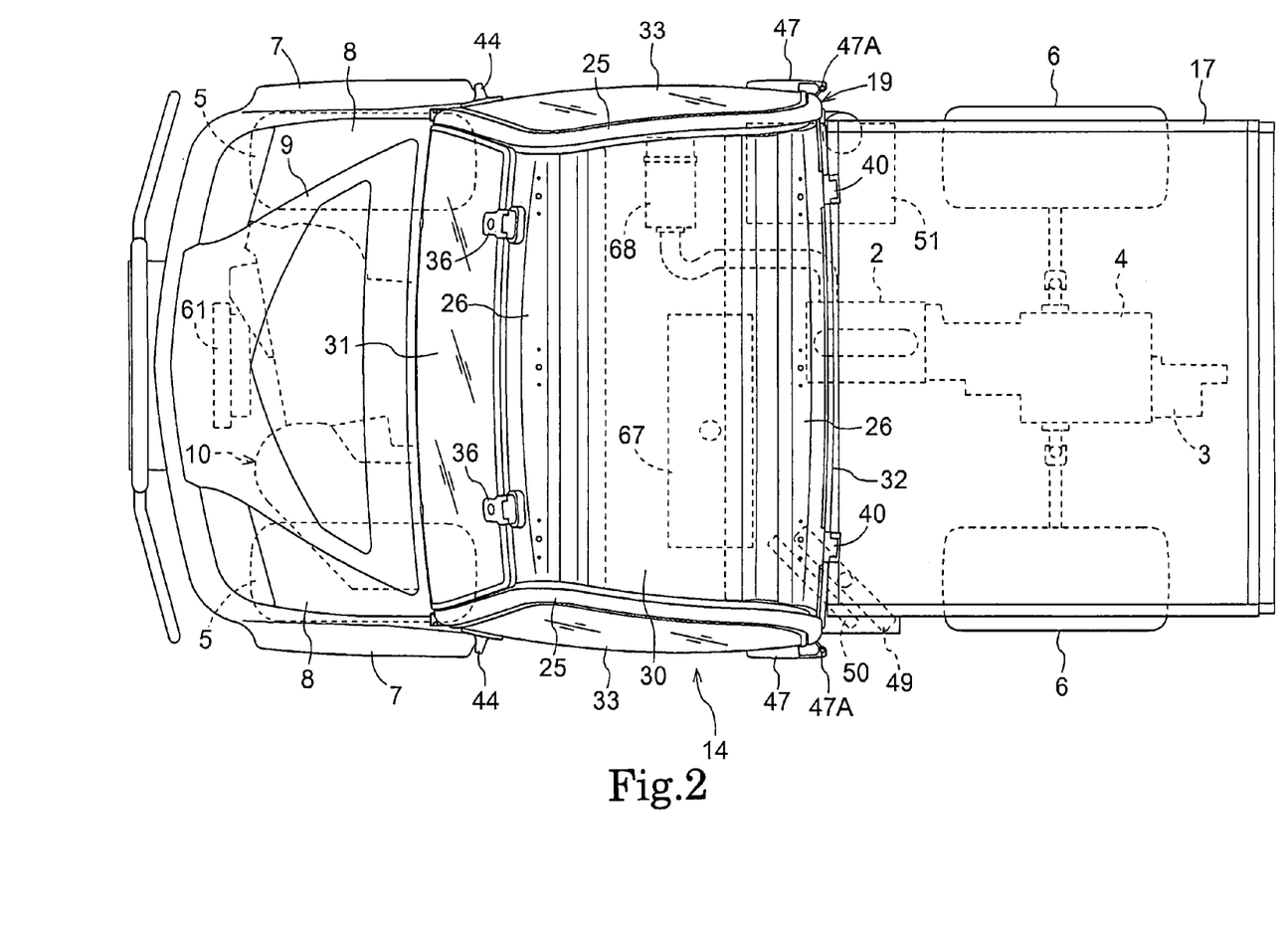
FIG. 2 is a plan view of the work vehicle.
Figure 3:
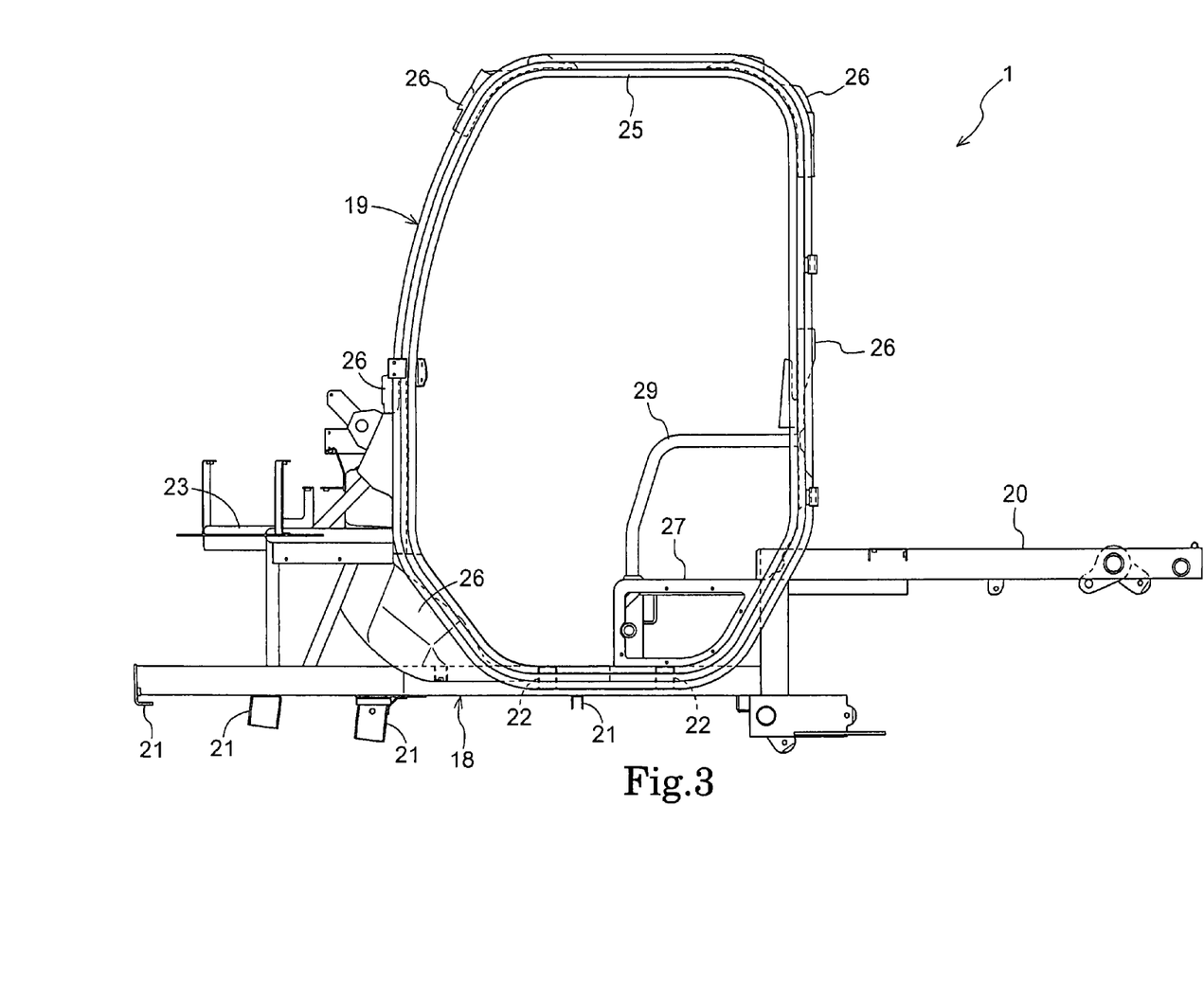
FIG. 3 is a side view showing frame structure of work vehicle.
Figure 4:
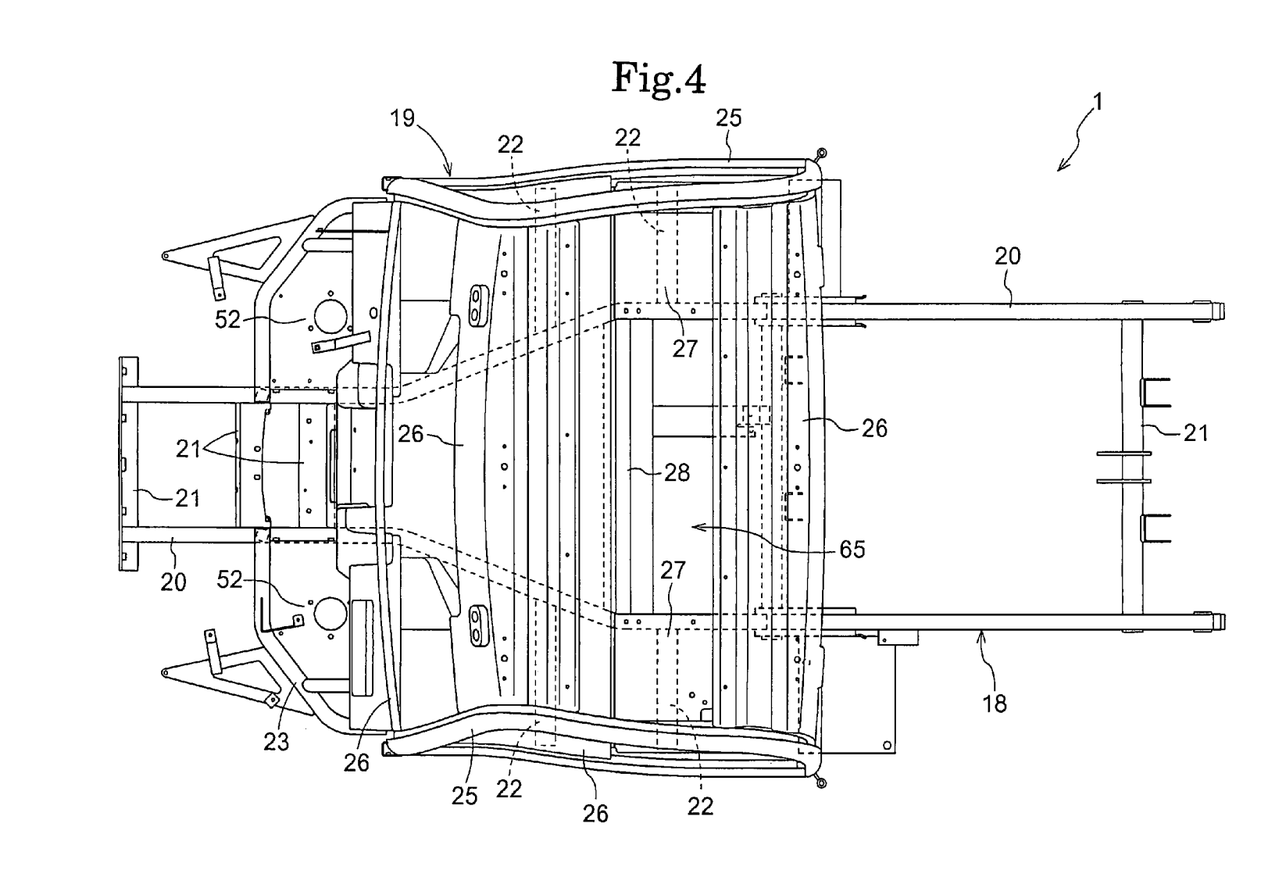
FIG. 4 is a plan view showing frame structure of work vehicle.
Figure 5:
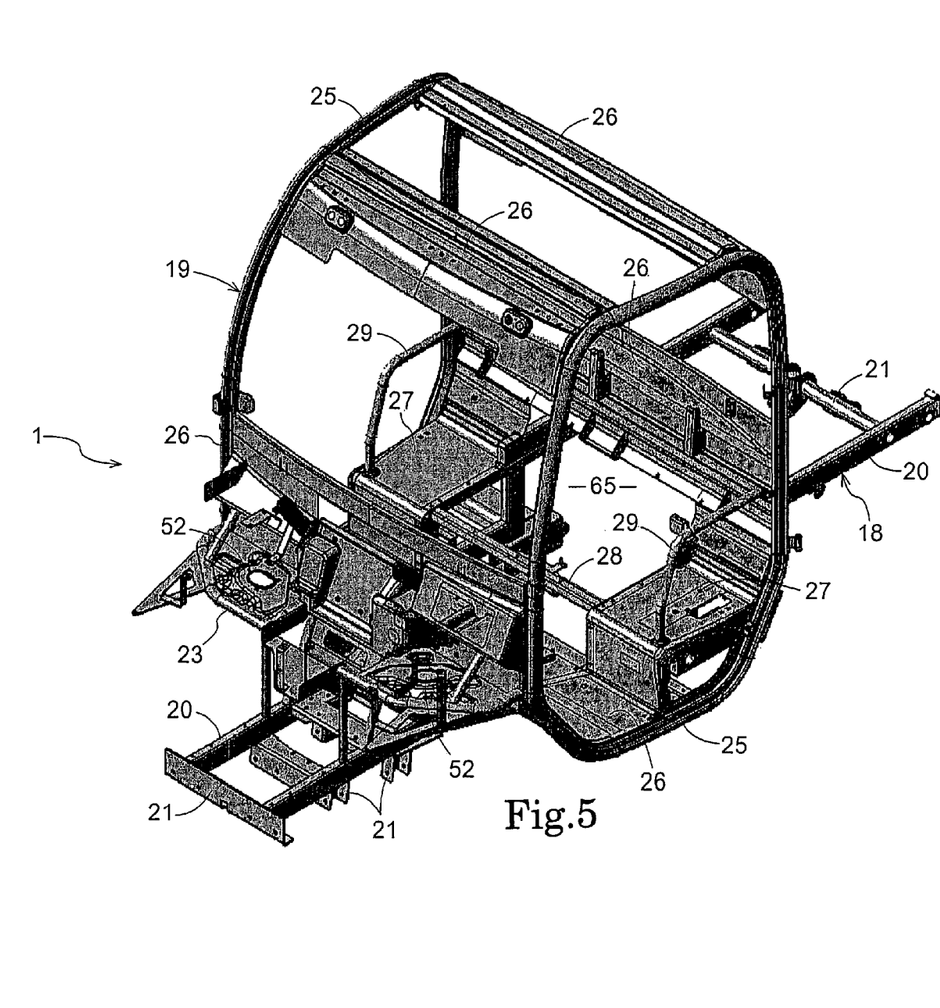
FIG. 5 is a perspective view showing frame structure of work vehicle.
Figure 6:
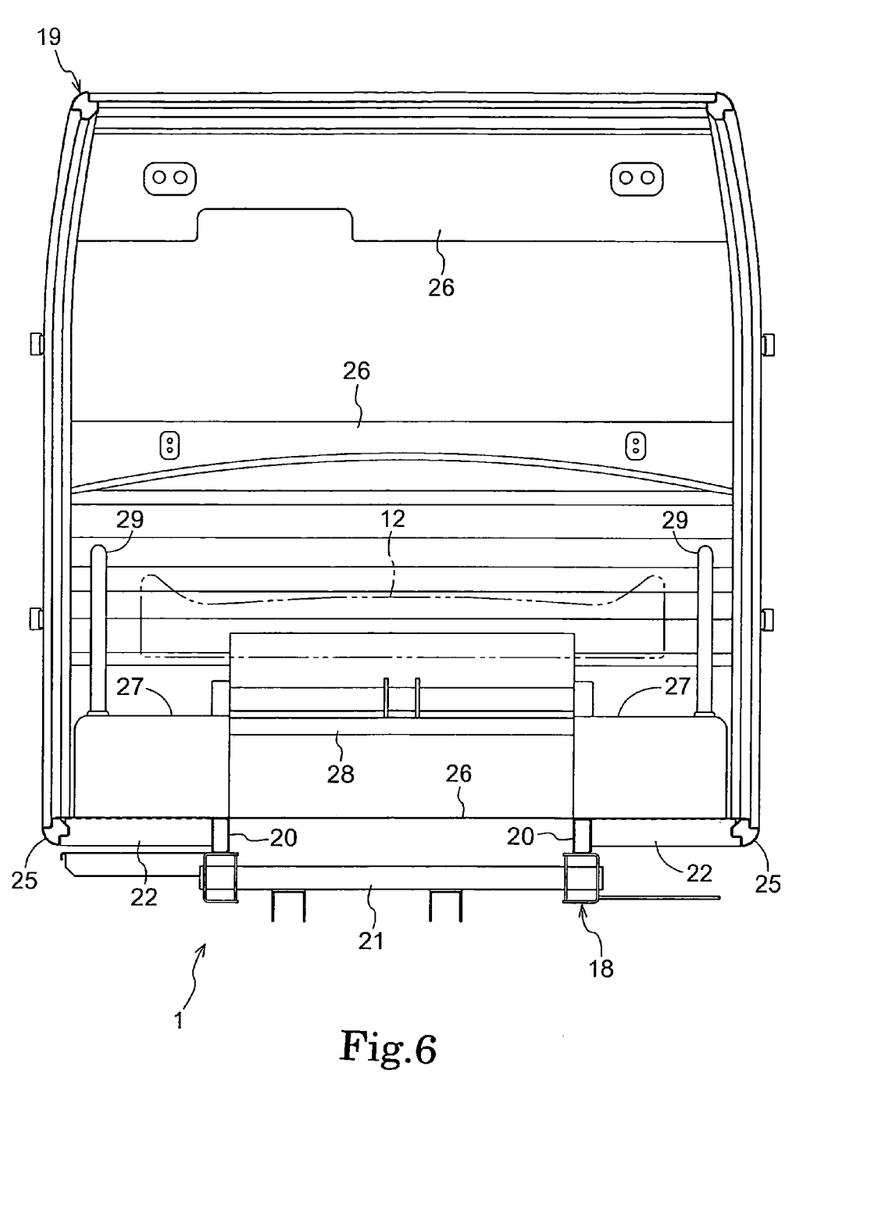
FIG. 6 is a vertical sectional front view of important section showing frame structure of work vehicle.
Figure 7:
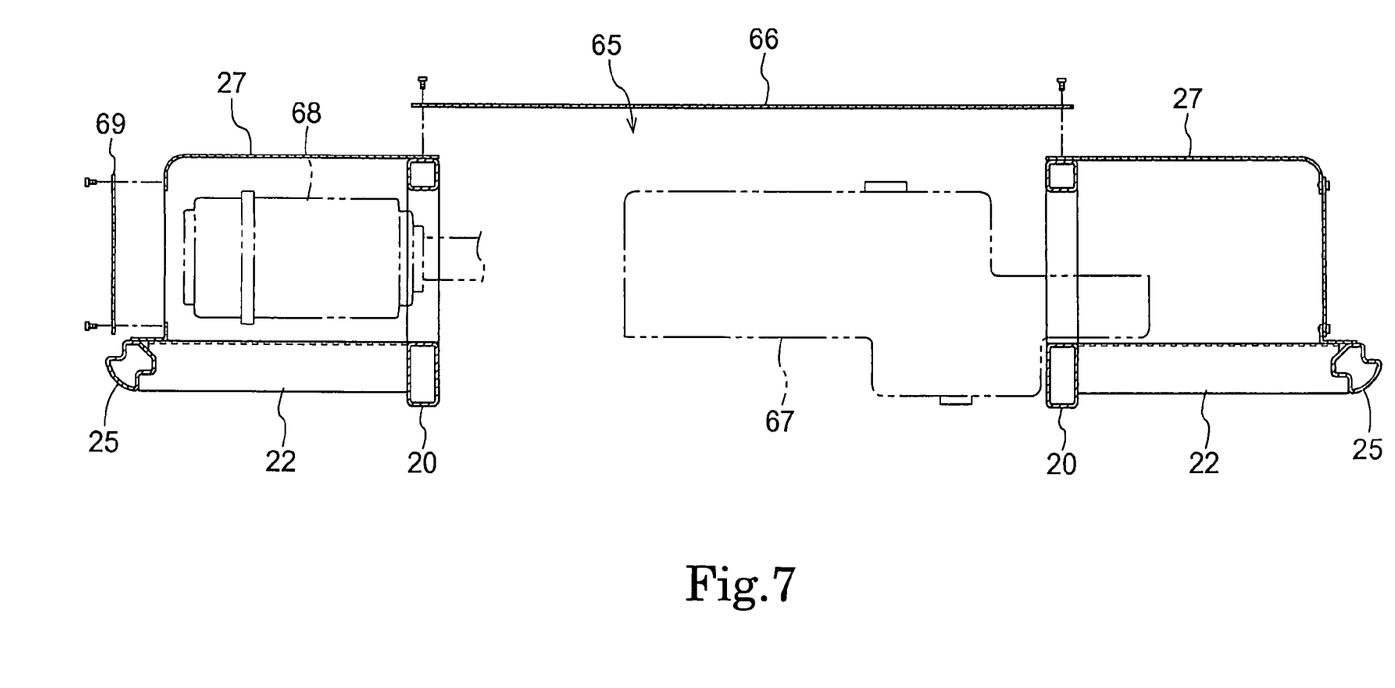
FIG. 7 is a vertical sectional front view of important section showing frame structure below the seat.

In FIG. 1, the entire plan view of the work vehicle suitable for transporting articles is shown, while the side view is shown in FIG. 2. This work vehicle is a four-wheel-drive type where the power from the engine 2, which is supported on the vehicle frame 1 via a vibration insulator, is transmitted through the hydrostatic type continuously variable speed change device 3 and the gear type speed change device 4, etc. to a pair of right and left front wheels 5 and the rear wheels 6.

Provided to the front of the vehicle are lower covering 7 that also functions as a front-wheel fender, the upper cover 8 with an opening in the upper and lateral central region, and a hood 9 that can cover and uncover the opening and that can be opened and closed by pivoting it, etc. The accommodation space formed by them houses the air conditioning unit 10 etc.

Provided in the longitudinally intermediate region of the vehicle body is the operator's area 13 with the steering wheel 11 for steering the front-wheels and the sofa type seat 12 supported for easy removal, etc. The cabin 14 which forms an operator space is also provided.

Arranged at the back of the vehicle body is a loading platform 17 that can pivot, about the laterally extending shaft 16 arranged in the rear end part of the vehicle frame 1, by actuation of the hydraulic dump cylinder 15 arranged above the gear type speed change device 4.

As shown in FIGS. 1-8, the vehicle frame 1 has a welded integral construction connecting the base frame 18 with the cabin frame 19 by welding. The cabin frame 19 that is constructed with sufficient strength to protect a passenger is also adapted to function as a reinforcement member for the vehicle frame 1.

The base frame 18 is formed by welding together: a pair of right and left side member 20; a plurality of cross members 21, a plurality of cabin cross members 22, and the support frame 23 for air conditioning units etc. The base frame 8, at its rear, supports the engine 2, and the gear type speed change device 4, etc. through the support frame 24 with vibration control connection equipment.

The cabin frame 19 is formed have a high strength box-like frame structure by welding together a pair of right and left side frames 25 that define the doorways, a plurality of cross members 26, a pair of right and left seat supporting members 27, a connecting member 28 that extends between the front upper portions of the right and left seat supporting members 27, and a pair of right and left hand rail members 29, etc.

Each of the right and left side frames 25 is formed by three dimensionally gently bending a single irregularly shaped pipe 35 with an approximate gourd-shaped cross section, such that the frame 35 has a three dimensional curve with relatively small curvature both in the lateral direction and longitudinal direction to improve appearance or an aerodynamic characteristic, after which bending, both ends are aligned straight in the back central location of the frame and are welded, and a closed-loop is formed by grinding and smoothing the welded joint.

Thus, forming each of the right and left side frames 25 in a closed-loop with a three-dimensional curve that can improve appearance or an aerodynamic characteristic not only improves appearance or an aerodynamic characteristic, but any external force applied to the cabin frame 19 is more readily absorbed and dissipated by the right and left side frames 25, which effectively prevents deformation or breakage, etc. of the cabin frame 19 due to local stress concentration.

And, since each of the side frames 25 is formed from a single irregularly shaped pipe 25, the structure provides better visibility and larger space because of the narrower frame width of the side frames 25, while reducing weight and improving strength of the side frames 25, and reducing the number of component parts of the side frames 25 and reducing production costs and improving productivity due to reduction in the number of welding points and smoothing points.

A sheet metal material pressed for greater strength is used as each of the cross members 26 of the cabin frame 19, which allows reduction in weight while maintaining a high degree of strength in the cabin frame 19.

Figure 8:
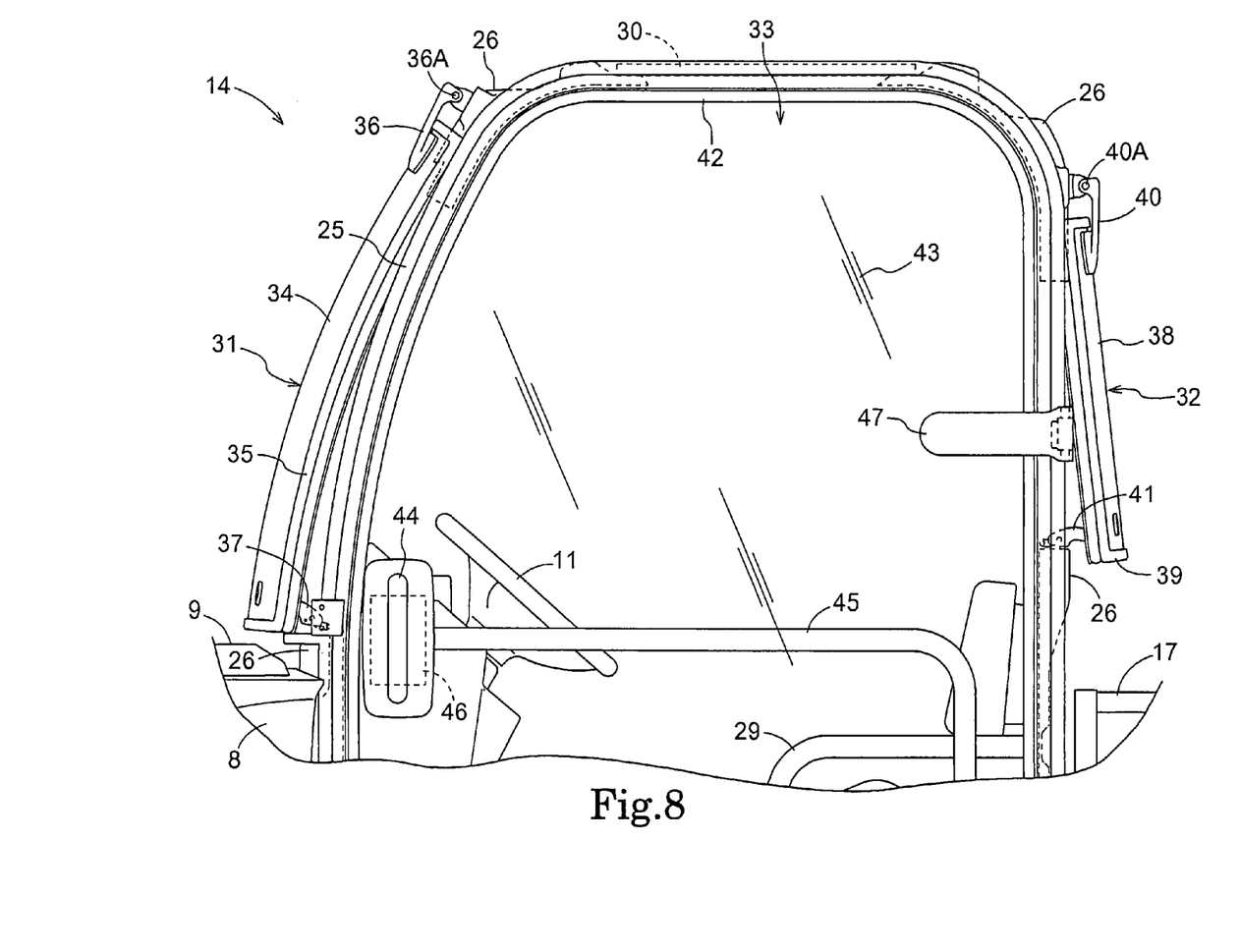
FIG. 8 is a side view of important section showing the cabin structure.

As shown in FIGS. 1, 2, and 8, the cabin 14 has the cabin frame 19 with a seat 12, a roof panel 30, the front panel 31, the rear panel 32, a pair of right and left door 33 of an out-swinging type, etc.

The front panel 31 has the transparent curved-surface glass 34 with its peripheral edge part provided with a weather strip 35. The upper edge portion is connected with the cabin frame 19 through a pair of right and left hinges 36 and the lower peripheral portion is connected through a pair of right and left opening-and-closing holding fixture 37. Thus, the opening and closing of the rear panel 33 by back and forward swing about the supporting shaft 36A of each hinge 36 as well as maintaining the panel in a desired opening position and the closing position are made possible.

The rear panel 32 has the transparent curved-surface glass 38 with its peripheral edge part provided with a weather strip 39. The upper edge portion is connected with the cabin frame 19 through a pair of right and left hinges 40 and the lower peripheral portion is connected through a pair of right and left opening-and-closing holding fixture 41. Thus, the opening and closing of the rear panel 33 by back and forward swing about the supporting shaft 40A of each hinge 40 as well as maintaining the panel in a desired opening position and the closing position are made possible.

Each door 33 on either side has a frameless construction with the transparent curved-surface glass 43 which has the peripheral edge part provided with the weather strip 42, the outside handle 44 which allows the opening and closing operation from outside the cabin, and the inner side handle 45 which allows the opening and closing operation from inside the cabin, and the holding mechanism 46 with allows the release operation from inside and outside the cabin. The rear edge of the door 33 is connected through the upper and the lower hinges 47, which permit lateral opening and closing operations about a rear pivoting axis, i.e. the pivot shaft 47A of each hinge 47. As the door 33 is closed, and as the door 33 reaches a predetermined closed position, the holding mechanism 46 engages the fixing bracket provided to the cabin frame 19 to hold the door 34 in the closed position.

Because glass with curved-surface 34, 38, and 43 is used for the front panel 31, the rear panel 32, and right and left doors 33 that are operable to be opened and closed as mentioned above, the shape retaining characteristic is high which effectively prevents bending deformation resulting from an oscillation of the vehicle body etc. This helps each member, when in the closed position, to maintain the degree of adherence to the cabin frame 19 leading to outstanding waterproof and airtight characteristics resulting in improvement in comfort level of the cabin 14.

Figure 9:
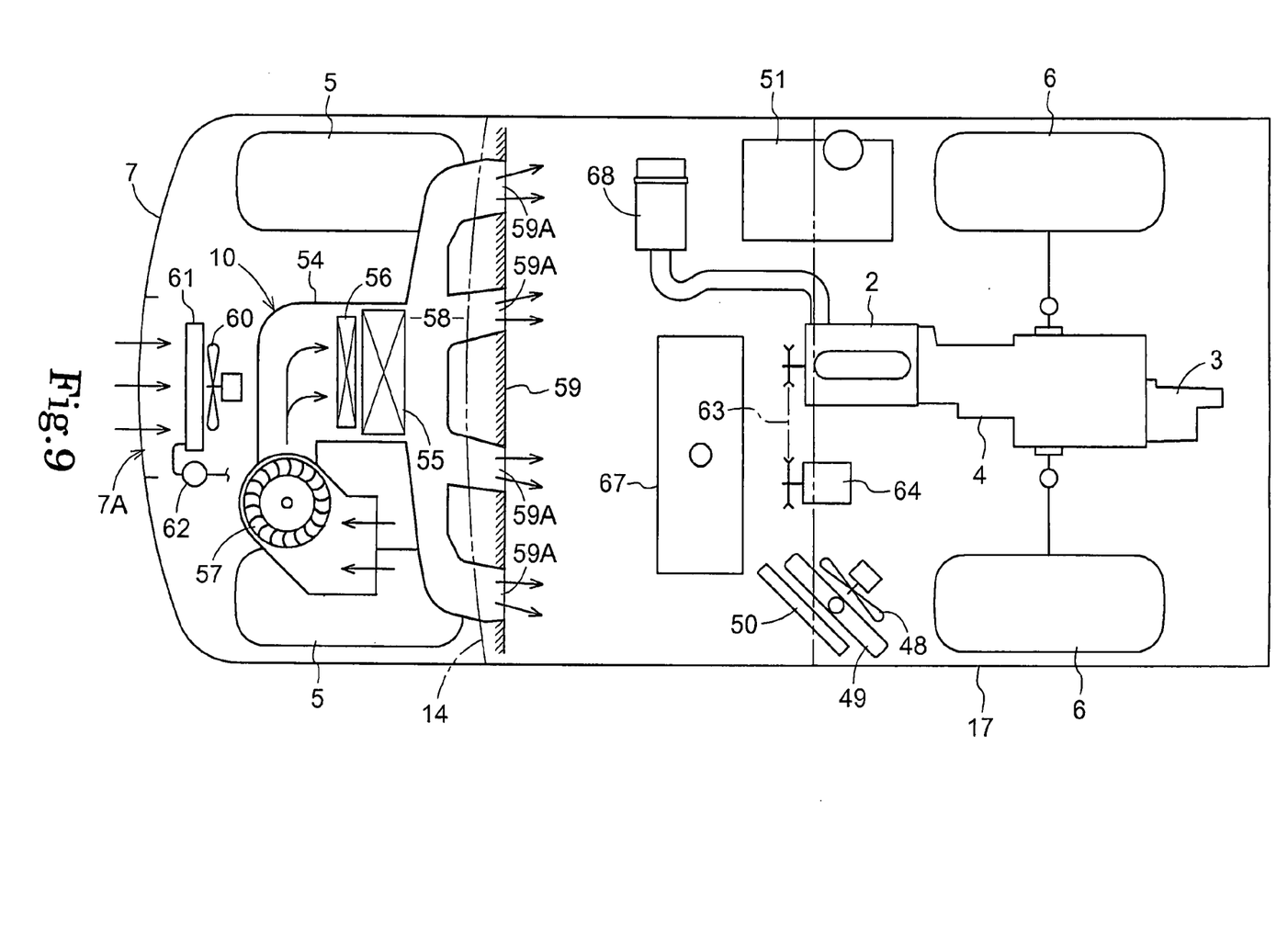
FIG. 9 is a diagrammatic plan view showing locations of the engine and the air conditioning unit.

As shown in FIGS. 1 and 2, and 9, an engine 2 is aligned such that the output shaft (not shown) extends along with the lateral direction of the vehicle body and is positioned in the rear of the vehicle body such that its front part overlaps with the side of a cabin 14 in side view. The gear type speed change device 4 is directly coupled with the back end of the engine 2, and the hydrostatic type continuously variable speed change device 3 is connected to the back end of the gear type speed change device 4.

That is, by locating the engine 2 in the rear of the vehicle, spaced apart from the air conditioning unit 10 in the front, it became easier to service both the engine 2 and the air conditioning unit 10 compared with the arrangement where the engine 2 and the air conditioning unit 10 are located within an enclosed space in the front of the vehicle.

The radiator 49 with an electric cooling fan 48 and an oil cooler 50 for cooling oil to be supplied to a hydraulic power steering unit (not shown) are arranged to the left of the engine with the fan 48 and the cooler 50 facing toward left front. A fuel tank 51, etc. are located to the right of the engine 2.

The entire longitudinal length of the vehicle can be made smaller by positioning the radiator 49 and the oil cooler on one side of the engine 2, and the fuel tank 51 on the other side of the engine 2 as compared with the arrangement where the radiator 49 etc. are located either forwardly of the engine 2 or rearwardly of the engine 2. The balance of the vehicle weight as well as intake flow of cooling air can also be improved.

As shown in FIGS. 1 to 5, 9 and 10, the support frame 23 has metal plate support members 52 that are welded to right and left side of the frame 23 and that are located at a relatively high location to receive the upper ends of the front wheel suspensions 53.

The air conditioning unit 10 has an evaporator 55 and a heater element 56 arranged in a fore and aft direction within its resin casing 54 and has low profile with the rotation shaft of the its sirocco fan 57 arranged vertically. The air conditioning unit 10 is supported by and mounted to the support frame 23.

Figure 10:
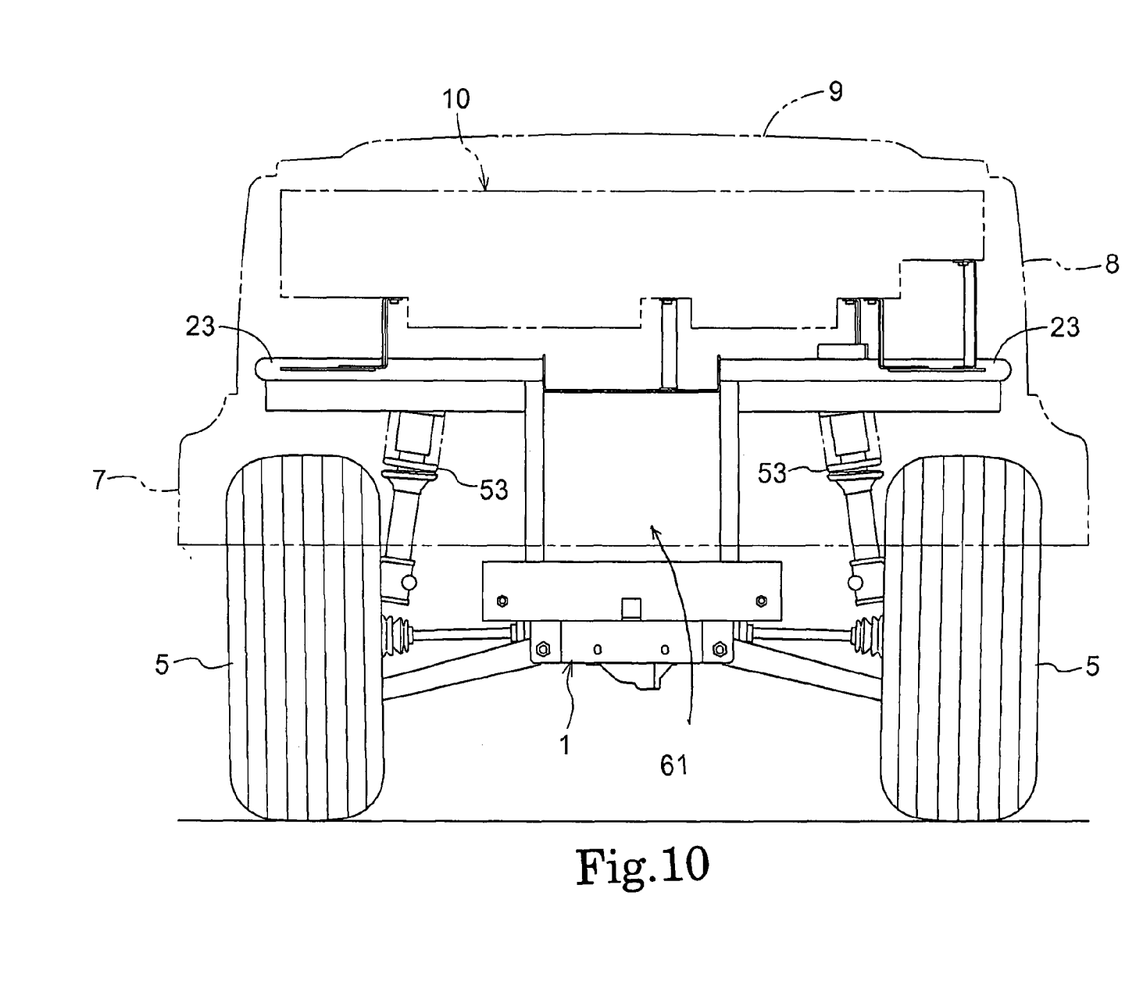
FIG. 10 is a vertical sectional front view of important section showing a support structure for the air conditioning unit.

That is, by utilizing a low profile air conditioning unit 10, the unit 10 can be arranged between the support frame 23 that receives the upper ends of the front wheel suspensions 53 and the upper cover 8 and the hood 9 without raising the upper end regions of the upper cover 8 and the hood 9. This helps avoid narrowing of field of view in the lower front direction of the vehicle and raising of the center of gravity of the vehicle, which happens when the seat 12 and the roof panel 30 need to be raised to secure the field of view. The air conditioning unit 10 may be located in the front lower portion of the cabin 14 without these inconveniences.

Also, by locating the air conditioning unit 10 in the lower front of the cabin 14, the center of gravity of the vehicle can be substantially lowered as compared with the air conditioning unit 10 provided to the upper portion of the cabin 14. This also allows supplying of conditioned air from a plurality of the outlets 59A provided to the instrument panel 59 in the cabin to the upper body of the operator as well as the lower body simply by providing the air conditioning duct 58 for guiding the conditioned air toward inside the cabin 14 from the air conditioning unit 10 without the necessity to extend the air conditioning duct from the upper portion to the lower portion of the cabin.

As shown in FIGS. 1, 2, and 9, a plurality of air inlet openings 7A are provided in the front laterally central region of the lower cover 7. An air conditioning condenser 61 with an electronic cooling fan 60 and a receiver tank 62 are provided between the air inlet openings 7A and the support frame 23 within the accommodating space formed by the lower cover 7, etc.

As shown in FIG. 10, the condenser 61 is located lower than and forwardly of the air conditioning unit and between the right and left front suspensions 53.

Therefore, cooling air created by the cooling fan 48 is supplied to the radiator 49 and the oil cooler 50 located in the rear of the vehicle and the cooling fan 60 supplies cooling air to the condenser 61 located in the front of the vehicle. This allows more efficient cooling compared with an arrangement where a single fan is used to supply cooling air to these parts.

As shown in FIG. 9, an air conditioner compressor 64, driven by the power of the engine 2 transmitted thereto by a transmission belt 64, is provided to the left of the engine 2.

This structure allows the loading platform, located above the engine 2 and the compressor 64, to be positioned at a lower level, compared with an arrangement where the compressor 64 is located above the engine 2, thus lowering the center of gravity of the vehicle and facilitating loading of objects onto the loading platform 17.

As shown in FIGS. 2, 4, 5, 7, and 9, a covering 66 made with sheet metal for covering the opening 65 formed between the seat support members 27 is attached such that the covering can be easily removed. Supplying oil to the oil tank 67 for the power steering unit arranged at the back lower part of the cabin 14 etc. can be easily performed by uncovering the opening 65 by removing this covering 66 and the seat 12.

The air cleaner 68 is arranged under the right-hand side seat support member 27. Elements of this air cleaner 68 can be easily replaced by removing the covering 69 that is removably bolt-connected to the right side part of the right-hand side seat support component 27.

OTHER EMBODIMENTS

[1] The work vehicle may be agricultural work vehicle such as a tractor or a combine, or a construction vehicle such as a back hoe, and a foil loader, etc.

[2] The cabin 14 may be detachably attached to the base frame 18 or supported to the base frame with one or more of vibration isolator(s).

[3] Various modifications may be made to the structure of the cabin 14. For example, a door 33 can be provided only to one side of the vehicle. Or a door 33 that opens and closes by sliding may be used. Metal sheets or a rectangular pipe material may be used for the side frames 25. The front panel 31, the rear panel 32, or the right or left door 14 may use a flat sheet glass, or polycarbonate resin plate, which is lighter, easier to deal with, and stronger than glass, or acrylic plate, which is lighter, more transparent, more weather resistant, and stronger against impact than glass.

[4] The compressor 64 may be located to the right of or above the engine 2.

[5] The condenser 61 may cooled by air flowing through the inlet openings 7A of the lower cover 7 when vehicle is running without providing the cooling fan 60 for the condenser.

[6] A radiator 49 with an electric cooling fan 48 may be provided to one lateral side of the engine 2 with the radiator 49 facing toward an outer rearward direction. The radiator 49 may be oriented laterally.

[7] The radiator 49 with an electric cooling fan 48 may be provided to one lateral side of the engine 2 and the condenser 61 with an electric cooling fan 60 to the other lateral side of the engine 2 with each facing outwardly and forwardly so as to supply cooling air from the right and left cooling fans 48 and 60 to the engine 2.

[8] An air conditioning unit 10 with a fan 57 oriented vertically may be utilized.

What is claimed is:

1. A work vehicle comprising:
a pair of front wheels;
a pair of rear wheels;
a vehicle body framework including:
   a base frame supporting the pair of front wheels and the pair of rear wheels;
   a cabin frame provided integral with the base frame at a fore/aft center of the base frame to form a cabin of the vehicle;
   a pair of right and left side members having a front half region and a rear half region; and
   a support frame located forwardly of the cabin frame and upwardly of the right/left side members;
front wheel suspensions located under the support frame, each of the front wheel suspensions having an upper end thereof supported by the support frame;
an upper cover located in front of the cabin, the upper cover having a hood for covering and uncovering an opening in the upper cover;
an engine located downwardly of the rear half region of the side members;
a loading platform located upwardly of the rear half region of the side members;
an air conditioning unit housed under the hood, the air conditioning unit including:
   a casing;
   an evaporator housed in the casing and directly supported by the support frame; and
   a fan having a rotational axis that extends vertically, the fan generating airflow radial-outwardly of the vertical rotational axis such that the airflow can be supplied to the evaporator through the casing;
wherein an upper portion of the support frame is located upwardly of a forward portion of the base frame and downwardly of the hood to define an accommodating space for the air conditioning unit between the hood and the support frame; and
a condenser for the air conditioning unit located in the accommodation space, wherein the condenser is located below and forwardly of the air conditioning unit and on and between the right/left side members.

2. A work vehicle according to claim 1 further comprising:
a compressor for the air conditioning unit located downwardly of the rear half region of the side members and laterally of the engine.

3. A work vehicle according to claim 1 further comprising:
a radiator for cooling the engine, the radiator being located downwardly of the rear half region of the side members.

4. A work vehicle according to claim 1 further comprising:
a radiator for cooling the engine, the radiator being located downwardly of the rear half region of the side members and on one of a right lateral side and a left lateral side of the engine;
a fuel tank located downwardly of the rear half region of the side members and on the other of the right lateral side and the left lateral side of the engine.

5. A work vehicle according to claim 1 further comprising:
a heater located in a front of the evaporator for heating the evaporator;
a duct extending substantially across a lateral width of the cabin for guiding conditioned air from the air conditioning unit; and
a plurality of outlets provided rearwardly of the duct and arranged substantially across the lateral width of the cabin for supplying the conditioned air from the duct toward the inside of the cabin;

wherein the fan is located at one of right and left sides of the vehicle and the heater and evaporator are located at a right/left center of the vehicle, and wherein the conditioned air is supplied from the accommodating space for the air conditioning unit defined between the hood and the support frame through the duct and the plurality of outlets toward an inside of the cabin.

6. A work vehicle comprising:

a cabin located at a fore/aft intermediate position of a vehicle body;

an engine located at a rear portion of the vehicle body behind the cabin;

a loading platform located at the rear portion of the vehicle body above the engine;

an upper cover located at a forward portion of the vehicle body in front of the cabin, the upper cover having a pivotable hood for covering and uncovering an upper side of the forward portion of the vehicle body;

a base frame supporting right/left front wheels and right/left rear wheels;

a support frame disposed at a forward portion of the base frame forwardly of the cabin and comprising support members supporting upper ends of right/left front wheel suspensions, the support frame having an upper portion thereof located above the forward portion of the base frame and below the hood to define a first space between the support frame and the hood;

an air conditioning unit disposed in a horizontally-placed posture with a rotational axis of a fan thereof extending vertically, the air conditioning unit being located within the first space between the support frame and the hood and directly supported by the support frame;

a lower cover located at the forward portion of the vehicle body and forwardly of the cabin for covering a lower side of the forward portion of the vehicle body;

wherein the support frame defines a second space between the support frame and a right/left center of a forward portion of the lower cover;

wherein the forward portion of the base frame includes a pair of right/left side members; and wherein a horizontally-elongated condenser for the air conditioning unit is placed in a vertically-placed posture on and between the right/left side members and within the second space between the support frame and the right/left center of the forward portion of the lower cover to be below and forward of the air conditioning unit.

7. A work vehicle according to claim 6, wherein the base frame has a rearward portion thereof behind the cabin for supporting the right/left rear wheels, the rearward portion of the base frame being positioned upwardly of the forward portion of the base frame; and wherein the loading platform is mounted upwardly of the rearward portion of the base frame, the engine is located below the rearward portion of the base frame and at the right/left center of the vehicle body, and a compressor is located below the loading platform and on a lateral side of the engine.

8. A work vehicle according to claim 7 further comprising a radiator located within a third space defined at the rearward portion of the vehicle body below the loading platform and on one lateral side of the engine between the cabin and the right/left rear wheels.

9. A work vehicle according to claim 8 further comprising a fuel tank located within a fourth space defined at the rearward portion of the vehicle body below the loading platform and on the other lateral side of the engine between the cabin and the right/left rear wheels.

10. A work vehicle comprising:

a vehicle frame supporting a pair of front wheels and a pair of rear wheels and comprising:

a base frame comprising a pair of left and right side members, at least one cross member, and a support frame supported at an elevated location above the left and right side members; and a cabin frame connected with the base frame in the longitudinally intermediate region of the vehicle frame, the cabin frame comprising a pair of left and right side frames and at least one cross member to form an operator cabin, the base frame comprising a front region disposed forward of the cabin formed by the cabin frame and a rear region disposed rearward of the cabin formed by the cabin frame, the support frame provided in the front region of the base frame;

front wheel suspensions located under the support frame and laterally outside of the respective left and right side members, each of the front wheel suspensions having an upper end thereof supported by the support frame;

an engine supported by the base frame in the rear region thereof;

air conditioning unit directly supported by the support frame and comprising:

an evaporator; and a fan adjacent the evaporator and having a vertical rotational axis to generate radial-outwardly directed airflow to the evaporator; and a condenser for the air conditioning unit supported on and between the left and right side members of the base frame to be located below and forwardly of the air conditioning unit in the front region of the base frame and between the front wheel suspensions.

11. A work vehicle according to claim 10 further comprising:

a compressor for the air conditioning unit located downwardly of the rear half region of the side members and laterally of the engine.

12. A work vehicle according to claim 10 further comprising:

a radiator for cooling the engine, the radiator being located downwardly of the rear half region of the side members.

13. A work vehicle according to claim 10 further comprising:

a radiator for cooling the engine, the radiator being located downwardly of the rear half region of the side members and on one of a right lateral side and a left lateral side of the engine; and a fuel tank located downwardly of the rear half region of the side members and on the other of the right lateral side and the left lateral side of the engine.

* * * * *

UNITED STATES PATENT AND TRADEMARK OFFICE
CERTIFICATE OF CORRECTION

| | |
|---|---|
| PATENT NO. | : 7,913,505 B2 |
| APPLICATION NO. | : 11/511864 |
| DATED | : March 29, 2011 |
| INVENTOR(S) | : Nakamura |

It is certified that error appears in the above-identified patent and that said Letters Patent is hereby corrected as shown below:

On the title page, item [56]: References Cited, Other Publications, "2003 Porsche Boxter" should read
-- 2003 Porsche Boxster --

Claim 10, col. 8, line 31, paragraph beginning "air conditioning" should begin
-- an air conditioning --

Signed and Sealed this
Sixth Day of September, 2011

David J. Kappos
*Director of the United States Patent and Trademark Office*